UNITED STATES PATENT OFFICE 2,591,611

CHLORINE CONTAINING COMPOUNDS

Sidney D. Ross, North Adams, Mass., assignor to Sprague Electric Company, North Adams, Mass., a corporation of Massachusetts No Drawing. Application October 5, 1948, Serial No. 52,981

2 Claims. (Cl. 260—618)

This invention relates to halogenated butadiene compounds and more particularly refers to halogenated 1-phenyl-butadiene-1,3 compounds and useful products obtained therefrom.

It is an object of this invention to produce new chemical compounds, which are of value in the plastic and related fields. Additional objects will appear hereinafter.

My invention is concerned with 1-phenyl butadiene-1,3 compounds in which the phenyl ring is fully substituted, preferably with five chlorine atoms. The invention is also directed to employment of the foregoing compounds in polymerization systems, and the products obtained thereby. The preferred compounds of my invention are 1-pentachlorophenyl-butadiene-1,3, and its polymers.

The following examples will serve to illustrate the preparation of these butadiene compounds.

EXAMPLE 1

*Preparation of pentachlorophenyl allyl carbinol*

14.6 grams of clean magnesium turnings and 300 cc. of dry ether were placed in a flask. 78.5 grams of allyl bromide dissolved in 300 cc. of ether was added dropwise and the mixture refluxed for six hours. Thereafter, 139.3 grams of pentachlorobenzaldehyde suspended in ether was slowly added. The complex was decomposed with ammonium chloride and acetic acid, to give 135 grams of the crude carbinol, M. P. 101–107° C. The crude product was recrystallized from ethanol to raise the melting point to 105–109° C. Repeated recrystallization from SDA-30, gave a product, M. P. 112–113° C., which analysed as follows:

| Analysis | Per Cent Carbon | Per Cent Hydrogen |
|---|---|---|
| Calculated | 37.47 | 2.18 |
| Observed #1 | 37.51 | 1.98 |
| Observed #2 | 37.34 | 2.12 |

EXAMPLE 2

*Preparation of 1-pentachlorophenyl-butadiene-1,3*

32.05 grams of pentachlorophenyl allyl carbinol, prepared as in Example 1 was dissolved in 75 cc. of benzene. To the solution was slowly added 23.08 grams of thionyl chloride. The reactants were refluxed until the evolution of HCl had ceased. At the end of this time, more benzene was added; the solution was washed three times with water and dried over magnesium sulfate. Removal of most of the benzene caused crystallization of the butadiene derivative. Recrystallization from acetone brought the melting point to 120–122° C. This product analysed as follows:

| Analysis | Per Cent Carbon | Per Cent Hydrogen |
|---|---|---|
| Calculated | 39.68 | 1.65 |
| Observed #1 | 39.30 | 1.80 |
| Observed #2 | 39.50 | 1.56 |

It is contemplated that the carbinol of Example 1 might be dehydrated directly by passage over alumina at elevated temperatures, by dehydration over potassium acid sulfate, or by other known dehydration reactions.

While the invention is particularly concerned with 1-pentachlorophenyl-butadiene-1,3, it is contemplated that one or two of the halogen atoms in the benzene ring may be replaced by alkyl groups having from 1 to 3 carbon atoms, for example, 1-(2,3,5,6-tetrachloro-4-methyl phenyl)-butadiene-1,3 could be produced by a suitable change in the reactants referred to previously.

1-pentachlorophenyl-butadiene-1,3 is of particular value in polymerization systems. This material may be polymerized per se by heating above its melting point for a sufficient period to produce the desired degree of polymerization. The polymerization may be accelerated by use of peroxides and other known polymerization catalysts. While homopolymerization is possible, the butadiene compound is of particular value in copolymerization systems.

The butadiene structure of the compounds of my invention leads to the formation of elastomeric materials, particularly when the butadiene content is high. For the preparation of more or less rubber-like products, the following monomers are useful as copolymerizable materials: mono-olefins such as isobutylene, ethylene, propylene etc.; vinyl aromatic compounds such as styrene, pentachlorostyrene, dichlorostyrene; acrylonitrile etc. In some cases, the 1-pentachlorophenyl-butadiene-1,3 may be used along with butadiene-1,3 in copolymerization systems. Increased solvent and flame-resistance are among the benefits gained from the use of the halogenated compound in lieu of butadiene-1,3.

The butadiene compounds of my invention may be copolymerized with a wide variety of unsaturated compounds to produce useful materials.

Useful polymerizable compounds other than those listed in the previous paragraph include acrylic and alkylacrylic acids and their esters; vinyl acetate; 2-vinyl thiazoles; vinyl diphenyl sulfides; vinyl diphenyl oxides; vinyl furans; vinyl dibenzofurans; vinyl pyridine; divinyl benzenes; N-vinyl carbazole; alkyl vinyl ketones such as methyl vinyl ketone; divinyl acetylene, etc.

Where elastomeric products are desired, I generally prefer to employ between about 30 and about 90 percent by weight of my butadiene derivatives in the reaction mixture. When resinous and plastic products are desired, amounts of these derivatives between about 1% and about 30% by weight are usually effective.

Polymerization in the various systems described may be carried out en masse, in solution, in suspension or emulsion. Polymerizations may be accelerated by use of acidic catalysts and/or with use of a peroxide catalyst such as benzoyl peroxide catalyst such as benzoyl peroxide.

The butadiene derivatives of this invention have the further advantage of existing as solid monomers at room temperature. This simplifies storage and shipment and reduces the danger of polymerization before use, without requiring polymerization inhibitors. In addition, their homopolymers and copolymers have a wide variety of uses in the plastics industry.

As many apparently widely different embodiments of this invention may be made without departing from the spirit and scope hereof, it is to be understood that this invention is not limited to the specific embodiments hereof, except as defined in the appended claims.

I claim:
1. 1-Pentachlorophenyl-butadiene-1,3.
2. Pentachlorophenyl allyl carbinol.

SIDNEY D. ROSS.

REFERENCES CITED

The following references are of record in the file of this patent:

UNITED STATES PATENTS

| Number | Name | Date |
|---|---|---|
| 1,965,369 | Carothers et al. | July 3, 1934 |
| 2,038,593 | Muskat | Apr. 28, 1936 |
| 2,273,100 | Gleason | Feb. 17, 1942 |
| 2,293,774 | Soday | Aug. 25, 1942 |
| 2,437,421 | D'Alelio | Mar. 9, 1948 |